No. 12,678. REISSUED JULY 30, 1907.

N. L. DIGNEY.

ABDOMINAL SUPPORT.

APPLICATION FILED MAY 22, 1906.

WITNESSES

H. A. Lamb

M. T. Longden

INVENTOR

N. L. Digney

BY

M. Smith

ATTORNEY

UNITED STATES PATENT OFFICE.

NELLIE LENNON DIGNEY, OF BRIDGEPORT, CONNECTICUT.

ABDOMINAL SUPPORT.

No. 12,678. Specification of Reissued Letters Patent. Reissued July 30, 1907.

Original No. 812,120, dated February 6, 1906, Serial No. 281,294. Application for reissue filed May 22, 1906. Serial No. 318,254.

*To all whom it may concern:*

Be it known that I, NELLIE LENNON DIGNEY, a citizen of the United States, residing at Bridgeport, in the county of Fairfield and State of Connecticut, have invented a new and useful Improvement in Abdominal Supports, of which the following is a specification.

My invention relates to abdominal supports and has for its objects to support the abdomen firmly and yet with no undue pressure, and to afford a device which shall fit snugly to the person of the wearer.

With these ends in view my invention consists of the novel arrangement of parts such as will be hereinafter fully described and then pointed out in the claims which conclude this description.

Figure 1:
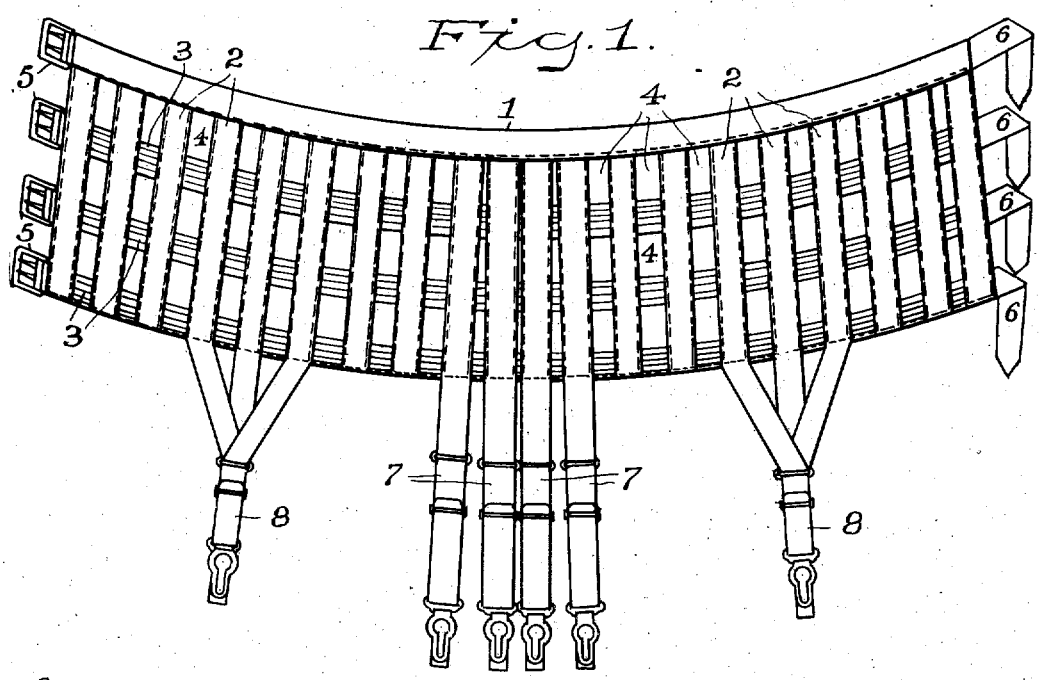
Figure 2:
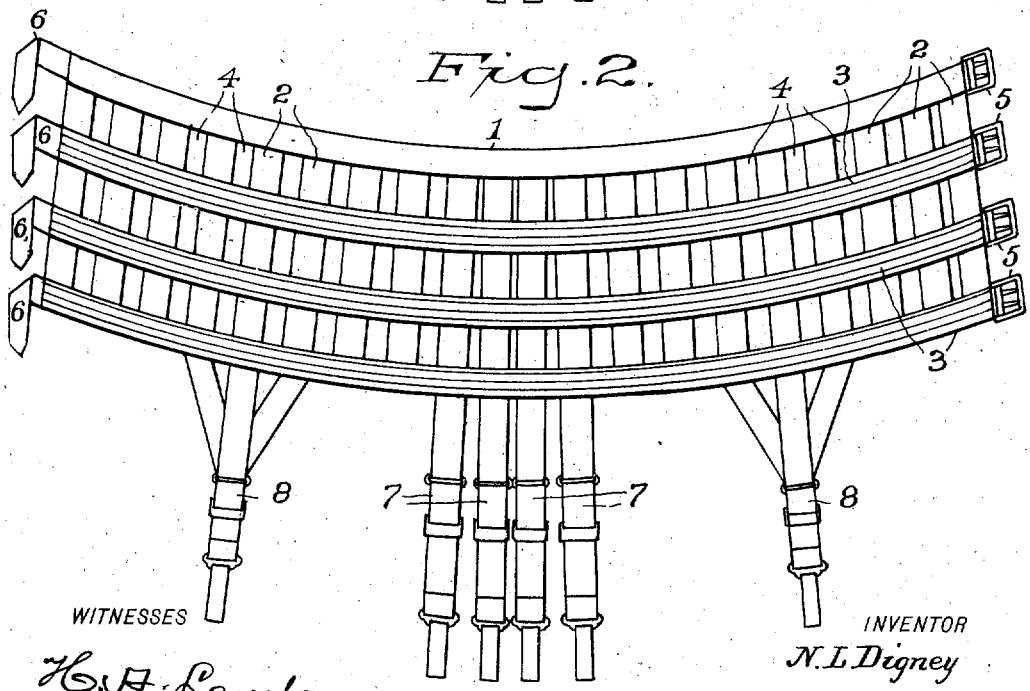

In the accompanying drawing Figures 1 and 2 are respectively front and rear elevations of the preferred form of my improvement.

Similar numbers of reference denote like parts in the several figures of the drawing.

1 is the waistband, and 2 are non-elastic short strips stitched to and depending from said band at intervals. This waistband is disposed in the form of a curve so as to fit the waist of the wearer while the strips depend radially from said band.

3 are elastic webbings disposed parallel to the band 1 and crossing the strips at intervals and secured to said strips by stitching. This arrangement of said strips and webbings provides intervening openings 4 whereby not only is a good ventilation afforded, but distortion and wrinkling of the device are unlikely to occur.

Referring to Figs. 1 and 2 of the drawing, buckles 5 and straps 6 may be provided at the ends of the support whereby the latter may be secured around the person of the wearer.

It is necessary that my improved abdominal support should be held so that it will not creep upward on the person of the wearer, and this can be accomplished in various ways and by the use of various appliances, all of which are very common. I prefer to secure hose supporter elements to the lower edge of my abdominal support as a means for exerting a tension which serves to keep the abdominal support in place and prevent it from creeping up on the person of the wearer, and accordingly at the front of the support I secure stocking engaging members 7, and at the side or hip portions of the support I secure stocking engaging members 8, as shown at Figs. 1 and 2, which members 7 and 8 depend from the support so that it will be clear that when the abdominal support is in position around the person of the wearer and the stocking engaging members connected with the stockings, a tension will be provided which acts to pull down the abdominal support and keep it in place. Any other straps may accomplish this result and it will therefore be clear that any suitable tension straps depending from the abdominal support will serve to keep the latter in its proper position, and therefore I do not wish to be limited in this respect, particularly since the novelty of my improvement attaches to the abdominal support and not to hose supporters, perineum straps and the like.

It is immaterial whether the ends of the abdominal support are united in front or in the rear, and while I have shown the support open in back and provided with suitable fastening in front it is to be understood that the point of opening is immaterial.

My improved abdominal support may be used by both men and women, as it possesses considerable merit as a truss or support to be worn after surgical operations in the region of the abdomen.

The provision of the elastic webbings lengthwise of the support enables the latter to adjust itself to the shape of the wearer so as to snugly fit the form, and the support will therefore yield to the movements of the body but will at the same time maintain a constant pressure against the abdomen and hips. When the tension straps are secured either to the stockings as in the instance of the members shown conventionally at 7, 8, or to any other approved means for maintaining a downward tension, a perfect fitting abdomen support is afforded which is elastic lengthwise but is unyielding in the direction of the strain on the tension straps.

The shape or design of the support may of course be altered to suit different forms and conditions without departing from the spirit of my invention.

I claim:—

An abdominal support, comprising horizontally disposed continuous elastic webbings and vertically disposed non-elastic strips, which strips and webbings are spaced apart and cross each other and are secured together, suitable fastenings whereby the support may be secured around the waist of the wearer, and tension straps crossing and secured to said elastic webbings and depending from the lower portion of said support.

In testimony whereof I affix my signature in presence of two witnesses.

NELLIE LENNON DIGNEY.

Witnesses:
F. W. SMITH, Jr.,
M. T. LONGDEN.